US009626025B2

(12) United States Patent
Suzuki

(10) Patent No.: US 9,626,025 B2
(45) Date of Patent: Apr. 18, 2017

(54) INFORMATION PROCESSING APPARATUS, INFORMATION PROCESSING METHOD, AND PROGRAM

(71) Applicant: Sony Corporation, Tokyo (JP)

(72) Inventor: Toshikazu Suzuki, Tokyo (JP)

(73) Assignee: Sony Corporation (JP)

( * ) Notice: Subject to any disclaimer, the term of this patent is extended or adjusted under 35 U.S.C. 154(b) by 207 days.

(21) Appl. No.: 14/395,283

(22) PCT Filed: Mar. 13, 2013

(86) PCT No.: PCT/JP2013/056909
§ 371 (c)(1),
(2) Date: Oct. 17, 2014

(87) PCT Pub. No.: WO2013/161416
PCT Pub. Date: Oct. 31, 2013

(65) Prior Publication Data
US 2015/0286324 A1 Oct. 8, 2015

(30) Foreign Application Priority Data

Apr. 23, 2012 (JP) ................................. 2012-097277

(51) Int. Cl.
G09G 5/00 (2006.01)
G06F 3/041 (2006.01)
(Continued)

(52) U.S. Cl.
CPC ......... G06F 3/0412 (2013.01); G01C 21/206 (2013.01); G01C 21/367 (2013.01); G01C 21/3664 (2013.01); G01C 21/3667 (2013.01); G01C 21/3682 (2013.01); G06F 3/04812 (2013.01); G06F 3/04842 (2013.01);
(Continued)

(58) Field of Classification Search
CPC ............... G01C 21/206; G01C 21/36–21/3697
See application file for complete search history.

(56) References Cited

U.S. PATENT DOCUMENTS 7,044,372 B2  5/2006 Okuda et al.
7,260,474 B1  8/2007 Thayathil et al.
(Continued)

FOREIGN PATENT DOCUMENTS

EP  1184792 A2  3/2002
JP  2002-122435 A  4/2002
(Continued)

OTHER PUBLICATIONS

International Search Report from International Publication PCT/JP2013/056909 mailed Jun. 18, 2013.
(Continued)

Primary Examiner — Charles Tseng
(74) Attorney, Agent, or Firm — Lerner, David, Littenberg, Krumholz & Mentlik, LLP

(57) ABSTRACT

Provided is an information processing apparatus including a display control unit configured to display a first map, and an operation detection unit configured to detect a first operation of selecting a first spot on the first map. The display control unit displays a second map associated with the selected first spot instead of the first map when the first operation is detected.

9 Claims, 14 Drawing Sheets

(51) Int. Cl.
  *G01C 21/20* (2006.01)
  *G01C 21/36* (2006.01)
  *G09B 29/10* (2006.01)
  *G06F 3/0481* (2013.01)
  *G06F 3/0484* (2013.01)
  *G06F 3/0488* (2013.01)
  *G06F 3/14* (2006.01)

(52) U.S. Cl.
  CPC ........ *G06F 3/04883* (2013.01); *G06F 3/1454* (2013.01); *G09B 29/106* (2013.01); *G06F 2203/04803* (2013.01)

(56) References Cited

U.S. PATENT DOCUMENTS

| | | | |
|---|---|---|---|
| 7,945,546 B2 * | 5/2011 | Bliss | G01C 21/367 707/705 |
| 2002/0059024 A1 * | 5/2002 | Ogaki | G01C 21/32 703/1 |
| 2003/0093419 A1 * | 5/2003 | Bangalore | G01C 21/3664 |
| 2005/0051623 A1 | 3/2005 | Okuda et al. | |
| 2006/0129636 A1 * | 6/2006 | Matsuura | G01C 21/3682 709/203 |
| 2007/0073475 A1 | 3/2007 | Endo | |
| 2008/0195303 A1 * | 8/2008 | Jung | G01C 21/3647 701/532 |
| 2008/0281516 A1 * | 11/2008 | Cummings | G01C 21/3476 701/414 |
| 2009/0271722 A1 * | 10/2009 | Park | G06F 3/0488 715/765 |
| 2009/0319181 A1 * | 12/2009 | Khosravy | G01C 21/20 701/532 |
| 2010/0023250 A1 * | 1/2010 | Mays | G09B 29/106 701/533 |
| 2012/0059582 A1 * | 3/2012 | Daniel | G01C 21/206 701/483 |

FOREIGN PATENT DOCUMENTS

| | | |
|---|---|---|
| JP | 2003-177030 A | 6/2003 |
| JP | 2004-294942 A | 10/2004 |
| JP | 2005-083941 A | 3/2005 |
| JP | 2006-138845 A | 6/2006 |
| JP | 2006-300522 A | 11/2006 |
| JP | 2007-093661 A | 4/2007 |
| JP | 2011-145164 A | 7/2011 |

OTHER PUBLICATIONS

Partial European Search Report for EP Application No. 13781918.1, dated Oct. 27, 2015.
Extended European Search Report for EP Application No. 13781918.1, dated Feb. 19, 2016.
Japanese Office Action for JP-2014512407 dated Feb. 2, 2016.
Chinese Office Action for Chinese Application No. 201380020036. X, dated Mar. 3, 2016.
European Office Action for Application No. 13781918.1 dated Feb. 1, 2017.

* cited by examiner

FIG. 9
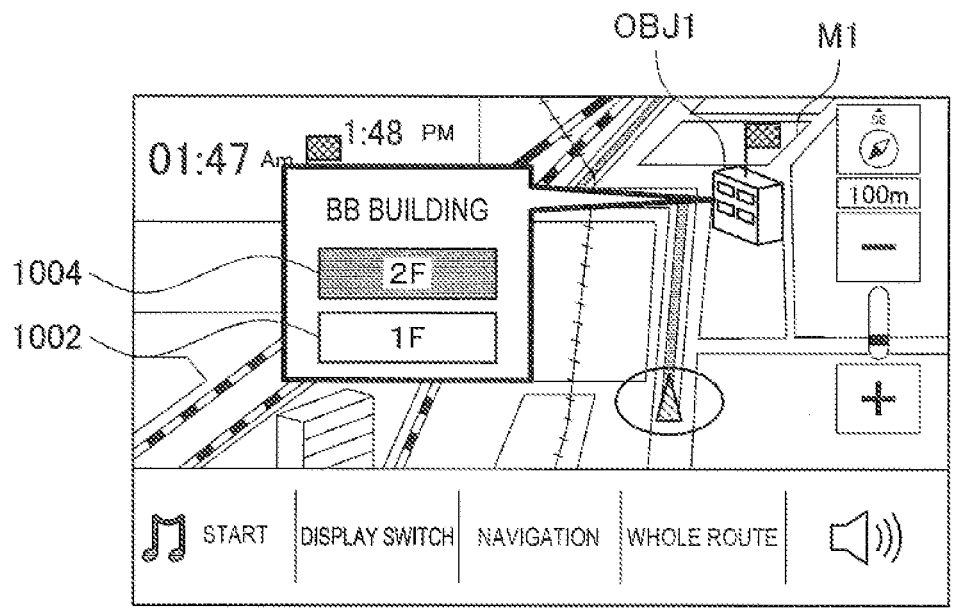
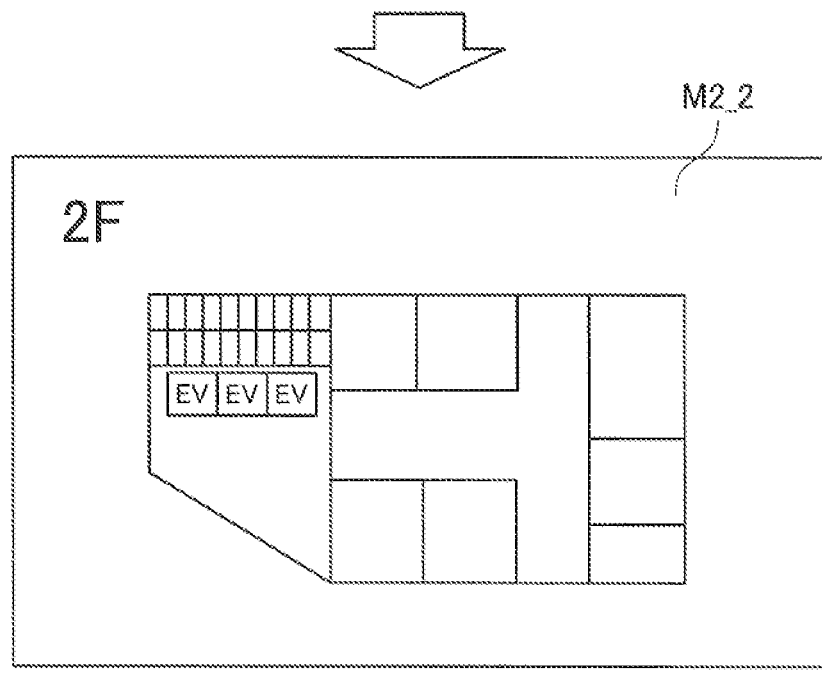

FIG. 10
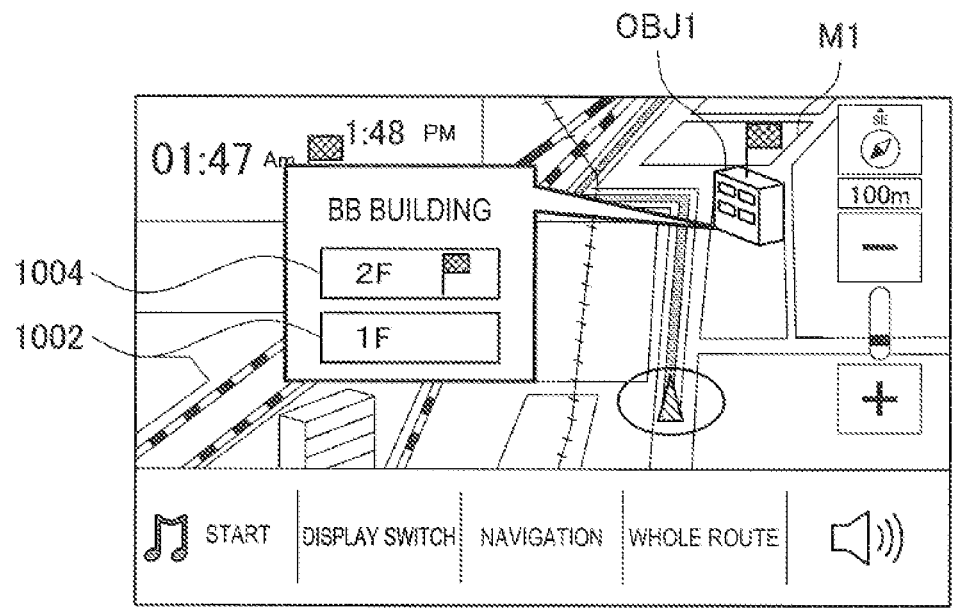
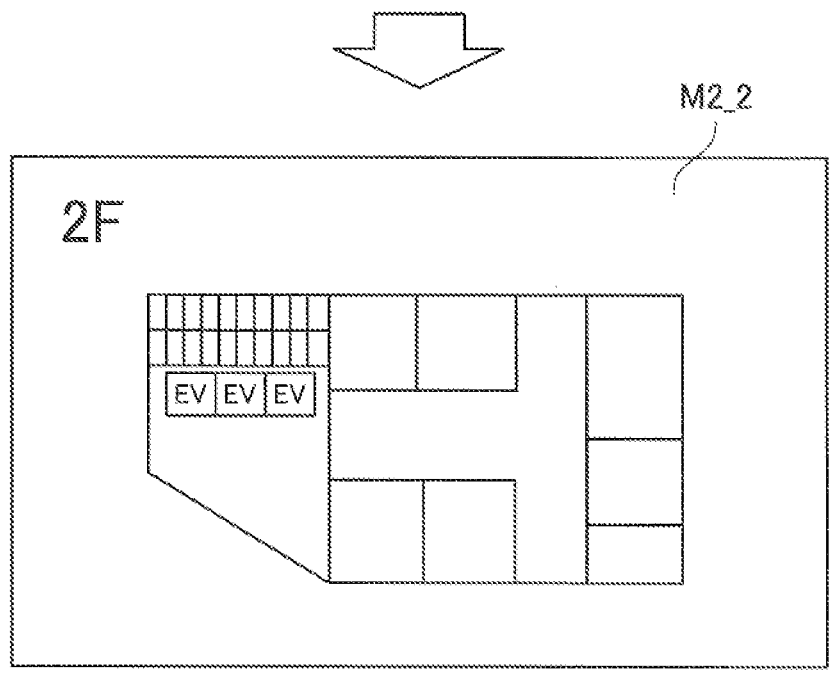

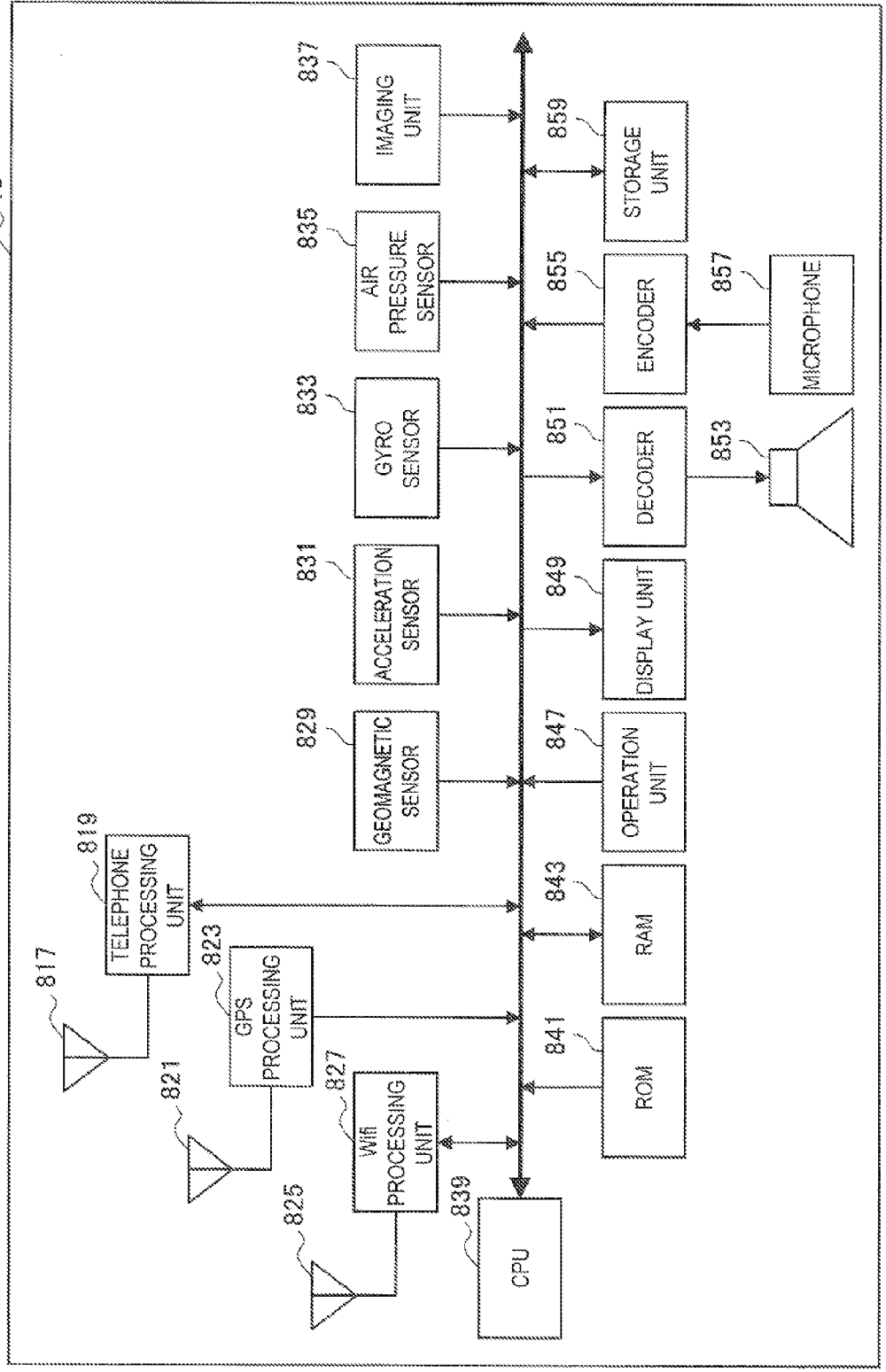

INFORMATION PROCESSING APPARATUS, INFORMATION PROCESSING METHOD, AND PROGRAM

CROSS-REFERENCE TO RELATED APPLICATION

The present application is a national phase entry under 35 U.S.C. §371 of International Application No. PCT/JP2013/056909 filed Mar. 13, 2013, published on Oct. 31, 2013 as WO 2013/161416 A1, which claims priority from Japanese Patent Application No. JP 2012-097277, filed in the Japanese Patent Office on Apr. 23, 2012.

TECHNICAL FIELD

The present disclosure relates to an information processing apparatus, an information processing method, and a program.

BACKGROUND ART

Services that use map data and position information are gaining widespread use today. This increases information relating to position information, and it is an important issue to efficiently provide information to users.

For example, Patent Literature 1 discloses a navigation device that displays a two-dimensional map and a three-dimensional map side by side. Once a given spot on the map is selected, this navigation device can show the selected spot on the two-dimensional map and the three-dimensional map. The navigation device can, for example, display, on the maps, the names of residents on the floors in a selected building.

CITATION LIST

Patent Literature

Patent Literature 1: JP 2007-93661A

SUMMARY OF INVENTION

Technical Problem

There is sometimes another map such as an indoor map associated with some spot on a map, but nothing has been mentioned regarding display switching between the maps. For example, if a user looks for information on the spot in a given method, finds the source where the map information on the spot is stored, and acquires the map information from the source, the acquired map can be displayed. This, however, imposes quite a few burdens on users.

The present disclosure shows a novel and improved information processing apparatus, information processing method, and program that can easily display another map associated with some spot on a map.

Solution to Problem

According to the present disclosure, there is provided an information processing apparatus including a display control unit configured to display a first map, and an operation detection unit configured to detect a first operation of selecting a first spot on the first map. The display control unit displays a second map associated with the selected first spot instead of the first map when the first operation is detected.

According to the present disclosure, there is provided an information processing method including displaying a first map, detecting a first operation of selecting a first spot on the first map, and displaying a second map associated with the selected first spot instead of the first map when the first operation is detected.

According to the present disclosure, there is provided a program for causing a computer to execute a display control function of displaying a first map, and an operation detection function of detecting a first operation of selecting a first spot on the first map. The display control function is a function of displaying a second map associated with the selected first spot instead of the first map when the first operation is detected.

Advantageous Effects of Invention

According to the present disclosure as described above, it is possible to easily display another map associated with some spot on a map.

BRIEF DESCRIPTION OF DRAWINGS

FIG. 9 is an explanatory diagram illustrating an example of a selection screen of the second maps for a plurality of floors, the selection screen being displayed by the navigation apparatus according to the present embodiment.

FIG. 10 is an explanatory diagram illustrating another example of the selection screen of the second maps for the plurality of floors, the selection screen being displayed by the navigation apparatus according to the present embodiment.

FIG. 17 is a block diagram illustrating a hardware configuration of the navigation apparatus according to the present embodiment.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The description will be made in the following order.
1. Functional Configuration Example
2. Operation Example
3. Hardware Configuration Example
4. Effect Example 1. Functional Configuration Example First, a functional configuration example of a navigation apparatus according to an embodiment of the present disclosure will be described with reference to FIGS. 1 to 15.

Figure 1:
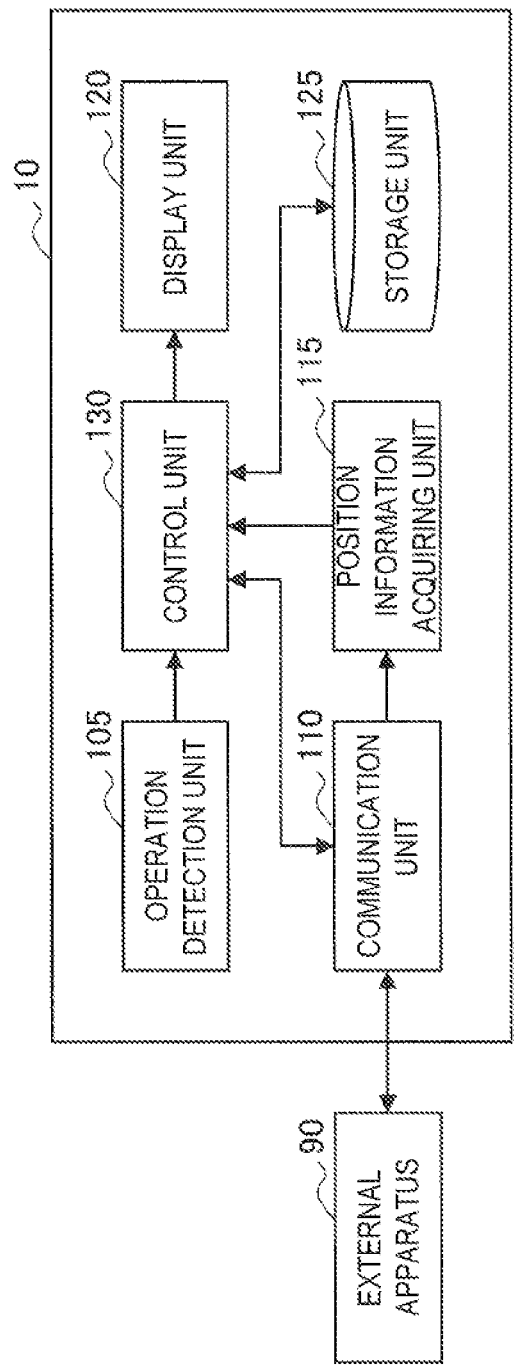
FIG. 1 is a block diagram illustrating a functional configuration of a navigation apparatus according to an embodiment of the present disclosure.

FIG. 1 is a block diagram illustrating a functional configuration example of a navigation apparatus according to an embodiment of the present disclosure.

Figure 2:
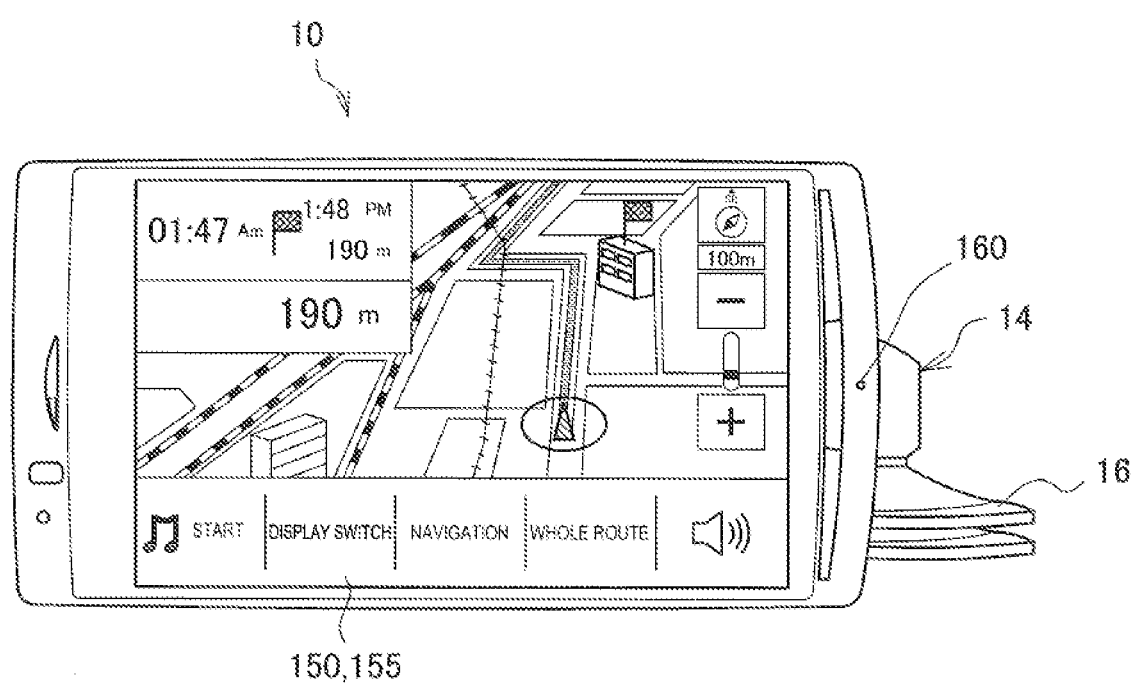
FIG. 2 is an explanatory diagram illustrating an example of an external appearance of the navigation apparatus according to the present embodiment.

FIG. 2 is an explanatory diagram illustrating an example of an external appearance of the navigation apparatus according to the present embodiment.

Figure 3:
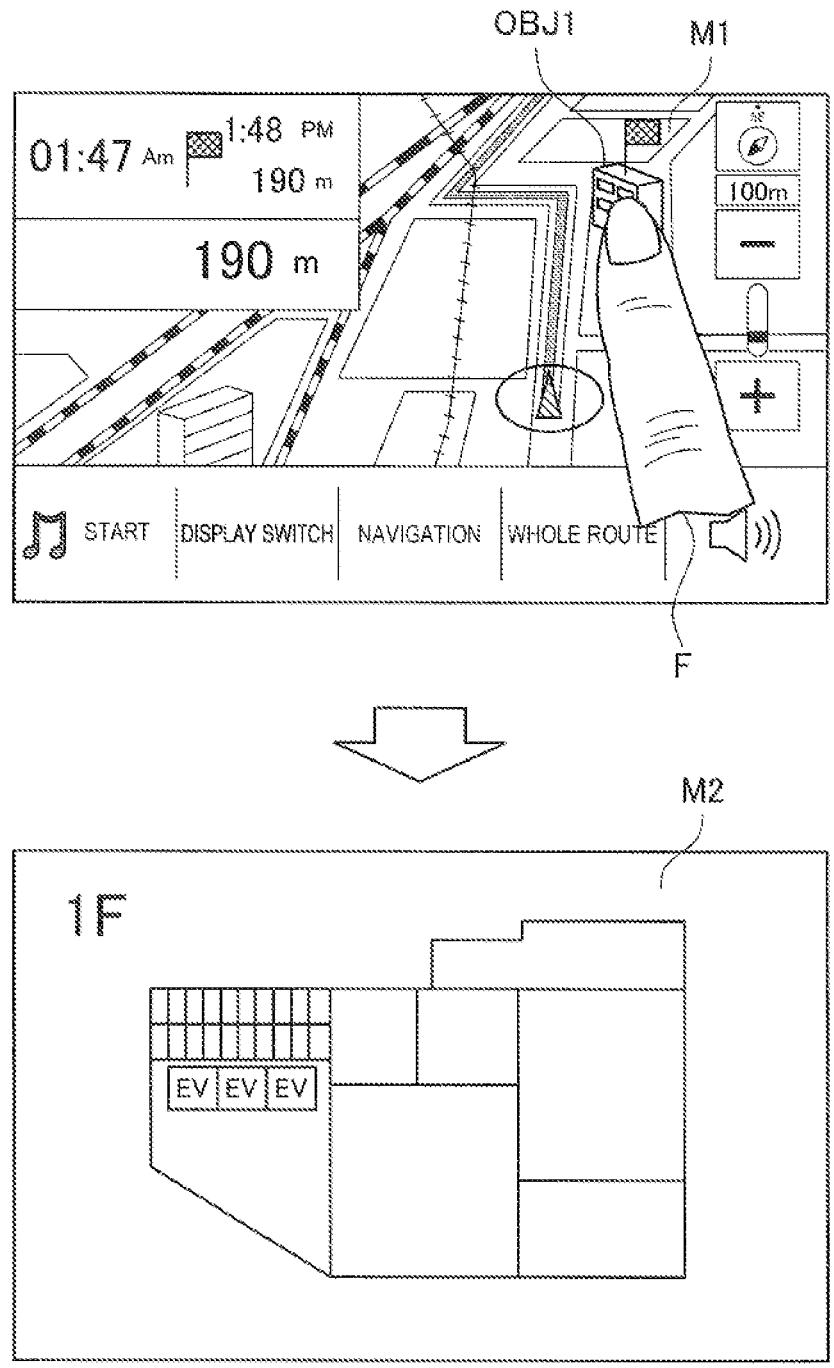
FIG. 3 is an explanatory diagram illustrating an overview of an operation of displaying a second map in the navigation apparatus according to the present embodiment.

FIG. 3 is an explanatory diagram illustrating an overview of an operation of displaying a second map in the navigation apparatus according to the present embodiment.

Figure 4:
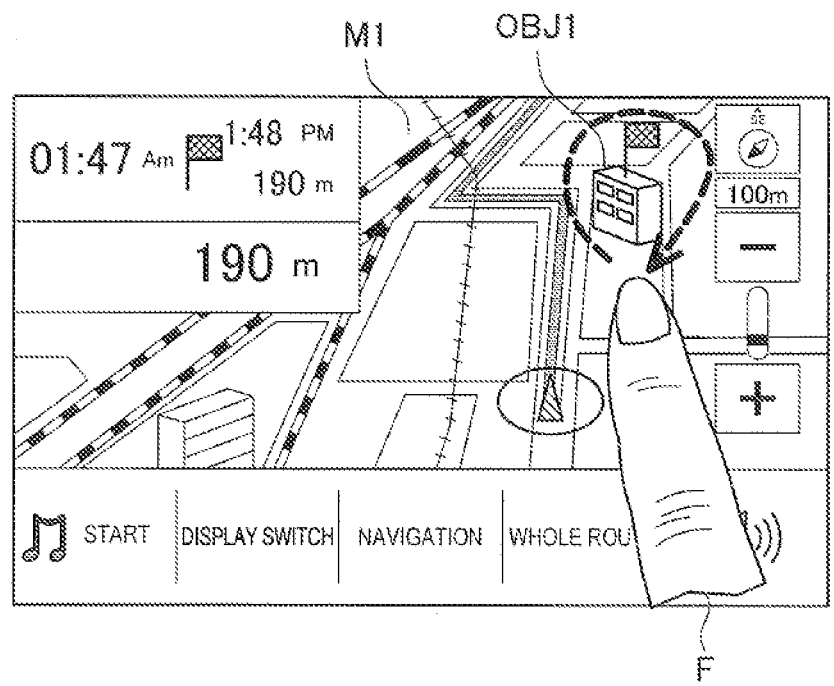
FIG. 4 is an explanatory diagram illustrating an example of an operation of selecting a spot for which the second map of the navigation apparatus according to the present embodiment is displayed.

FIG. 4 is an explanatory diagram illustrating an example of an operation of selecting a spot for which the second map of the navigation apparatus according to the present embodiment is displayed.

Figure 5:
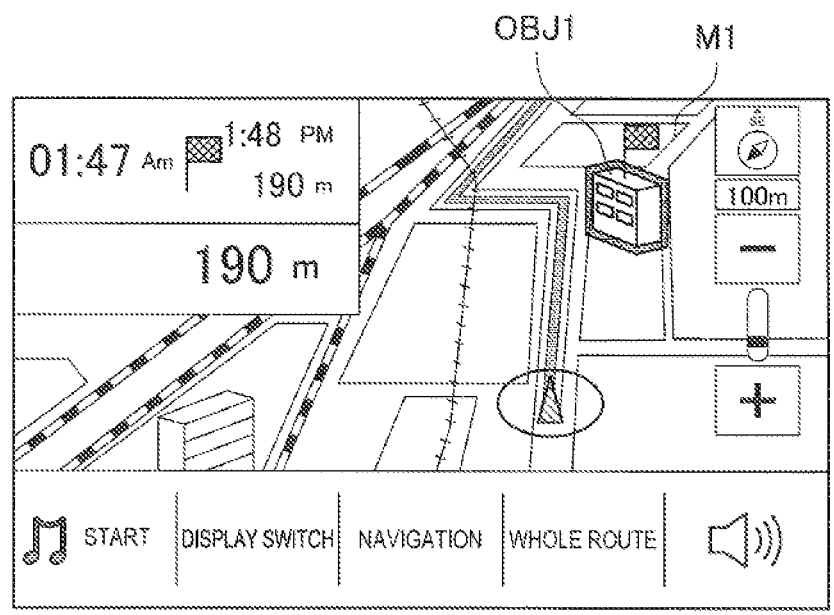
FIG. 5 is an explanatory diagram illustrating an example of a display form of a POI selected in the navigation apparatus according to the present embodiment.

FIG. 5 is an explanatory diagram illustrating an example of a display form of a POI selected in the navigation apparatus according to the present embodiment.

Figure 6:
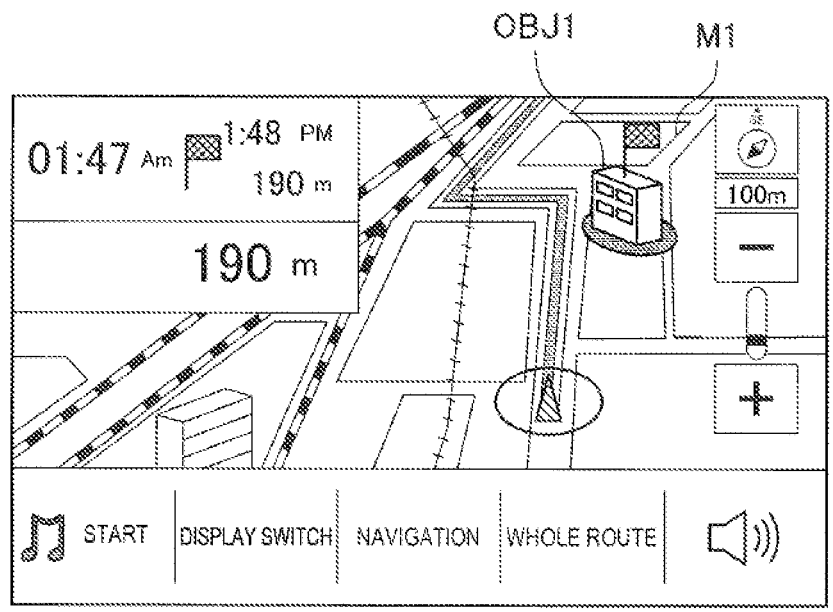
FIG. 6 is an explanatory diagram illustrating an example of the display form of the POI in the navigation apparatus according to the present embodiment, the POI having the second map.

FIG. 6 is an explanatory diagram illustrating an example of the display form of the POI in the navigation apparatus according to the present embodiment, the POI having the second map.

Figure 7:
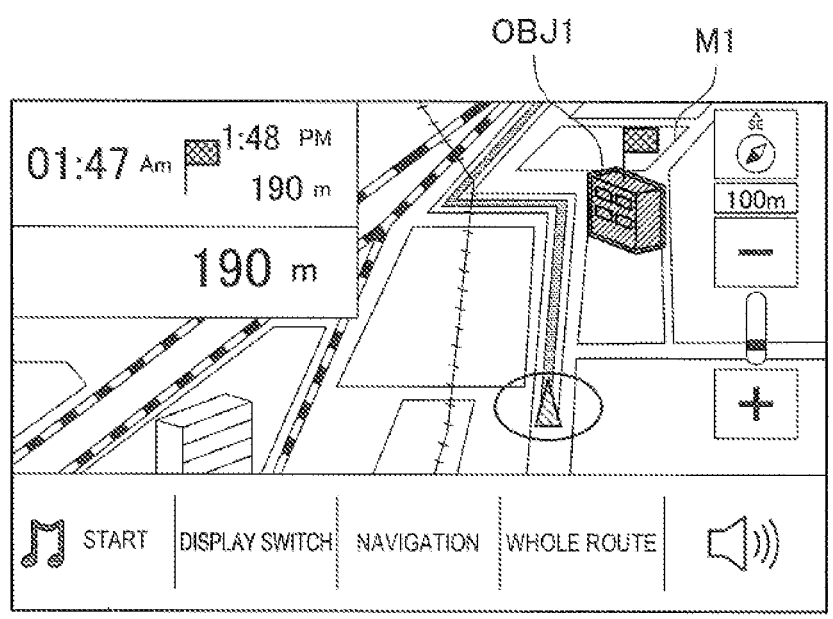
FIG. 7 is an explanatory diagram illustrating another example of the display form of the POI in the navigation apparatus according to the present embodiment, the POI having the second map.

FIG. 7 is an explanatory diagram illustrating another example of the display form of the POI in the navigation apparatus according to the present embodiment, the POI having the second map.

Figure 8:
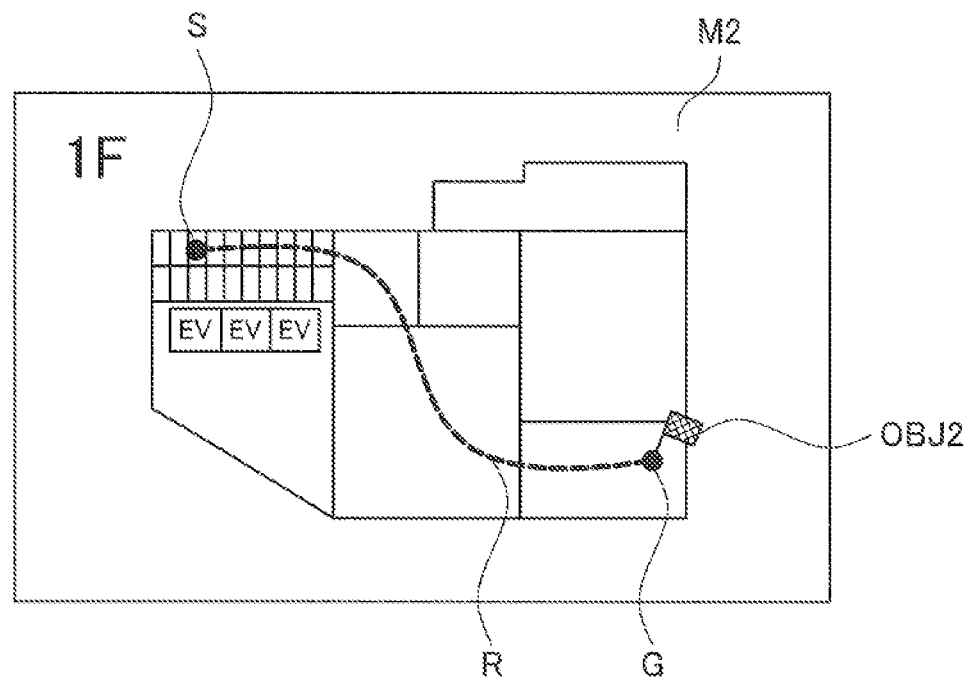
FIG. 8 is an explanatory diagram illustrating a display example of the second map, on which a route to a detailed destination displayed by the navigation apparatus according to the present embodiment is superimposed.

FIG. 8 is an explanatory diagram illustrating a display example of the second map, on which a route to a detailed destination displayed by the navigation apparatus according to the present embodiment is superimposed.

FIG. 9 is an explanatory diagram illustrating an example of a selection screen of the second maps for a plurality of floors, the selection screen being displayed by the navigation apparatus according to the present embodiment.

FIG. 10 is an explanatory diagram illustrating another example of the selection screen of the second maps for the plurality of floors, the selection screen being displayed by the navigation apparatus according to the present embodiment.

Figure 11:
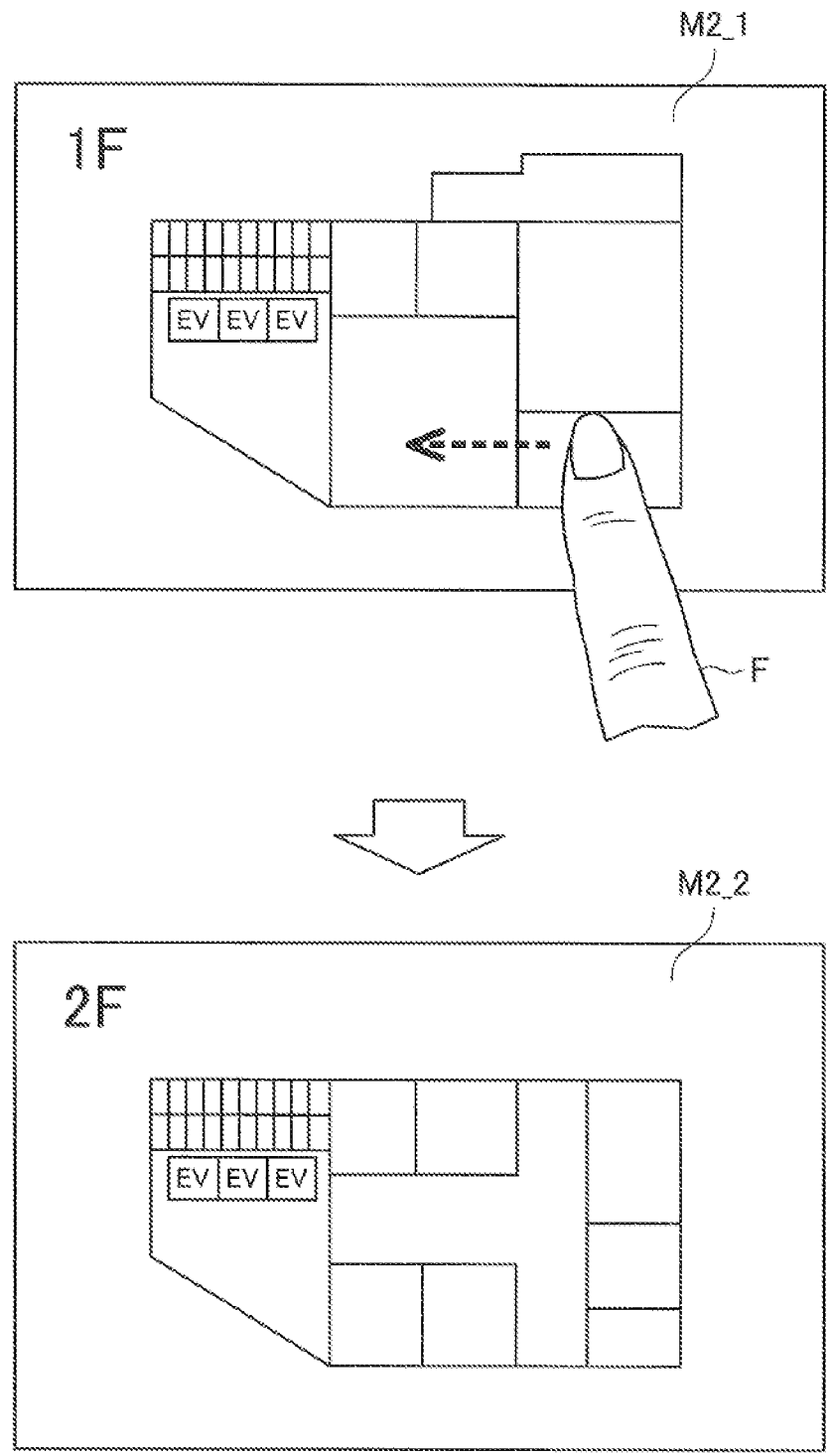
FIG. 11 is an explanatory diagram illustrating an example of an operation of switching the floors in the navigation apparatus according to the present embodiment.

FIG. 11 is an explanatory diagram illustrating an example of an operation of switching the floors in the navigation apparatus according to the present embodiment.

Figure 12:
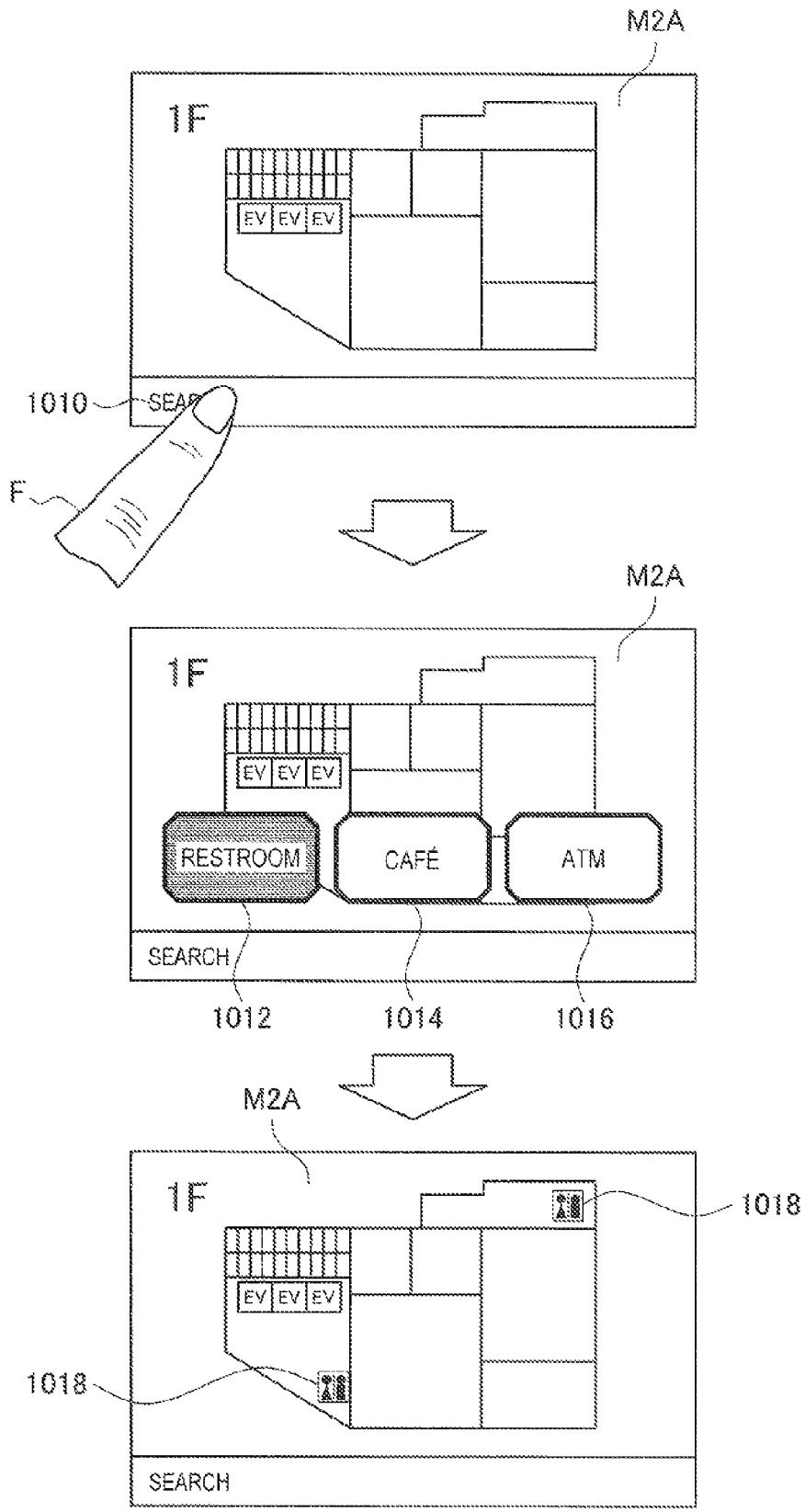
FIG. 12 is an explanatory diagram illustrating an example of a search screen of spots on the second map, the search screen being displayed by the navigation apparatus according to the present embodiment.

FIG. 12 is an explanatory diagram illustrating an example of a search screen of spots on the second map, the search screen being displayed by the navigation apparatus according to the present embodiment.

Figure 13:
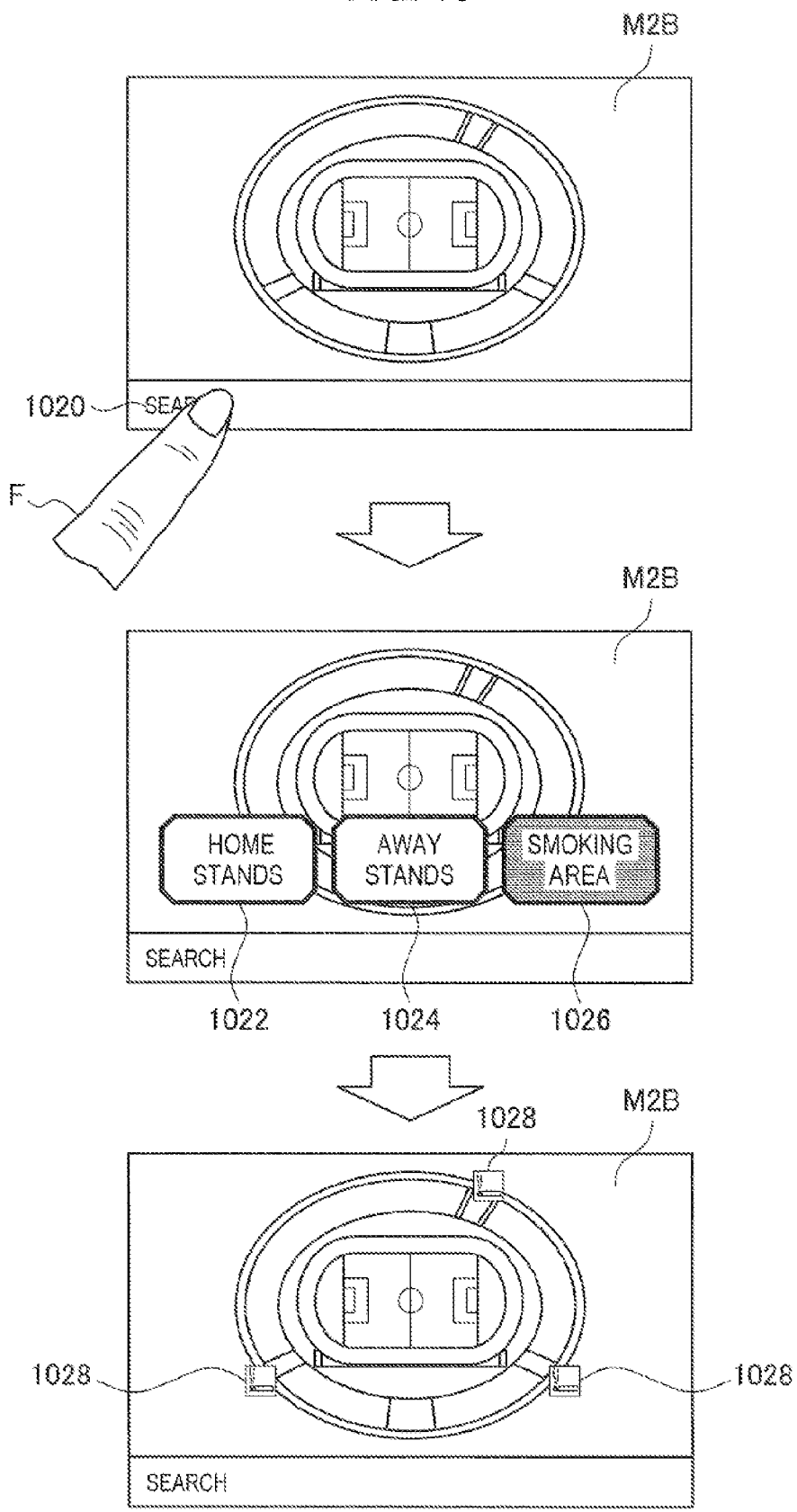
FIG. 13 is an explanatory diagram illustrating another example of the search screen of the spots on the second map, the search screen being displayed by the navigation apparatus according to the present embodiment.

FIG. 13 is an explanatory diagram illustrating another example of the search screen of the spots on the second map, the search screen being displayed by the navigation apparatus according to the present embodiment.

Figure 14:
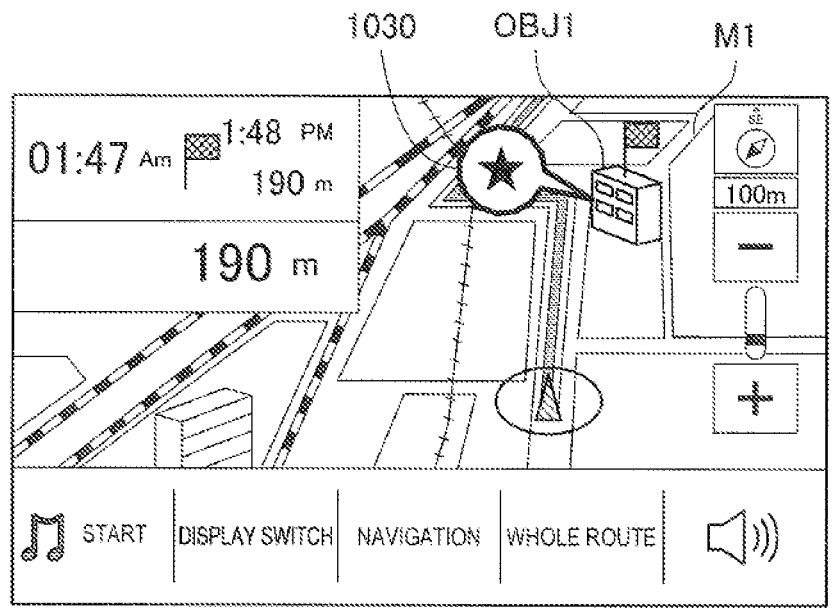
FIG. 14 is an explanatory diagram illustrating an example of a display screen displaying information that an external apparatus has proposed to the navigation apparatus according to the present embodiment.

FIG. 14 is an explanatory diagram illustrating an example of a display screen displaying information that an external apparatus has proposed to the navigation apparatus according to the present embodiment.

Figure 15:
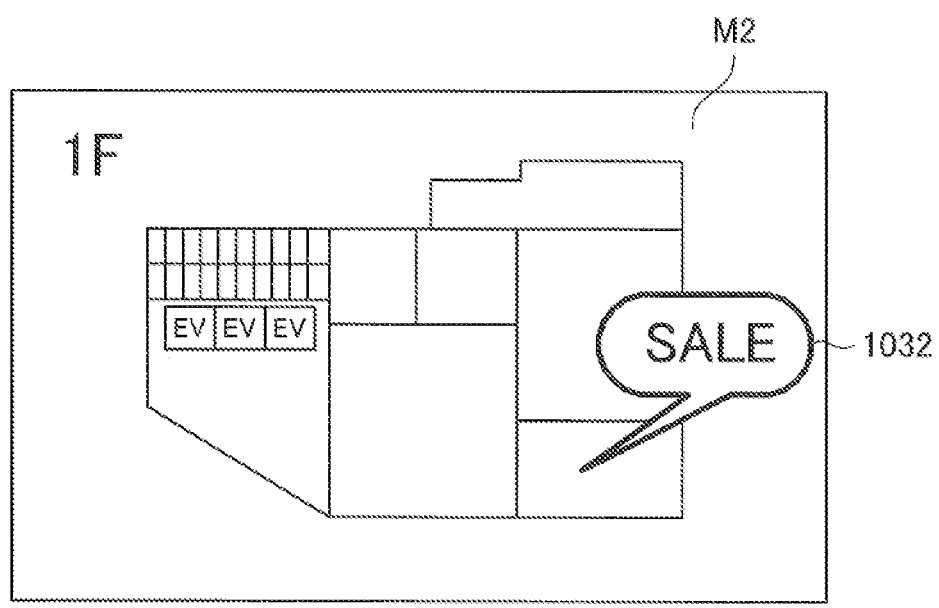
FIG. 15 is an explanatory diagram illustrating another example of the display screen displaying information that an external apparatus has proposed to the navigation apparatus according to the present embodiment.

FIG. 15 is an explanatory diagram illustrating another example of the display screen displaying information that an external apparatus has proposed to the navigation apparatus according to the present embodiment.

The navigation apparatus may be an information processing apparatus having a navigation function as the main function, or an information processing apparatus having a navigation function as one of the functions of mobile phones, for example. A navigation apparatus will be here used as an example to describe an example of an information processing apparatus to which the technology according to an embodiment of the present disclosure is applied, but the present technology is not limited thereto. The information processing apparatus to which the present technology is applied may include information processing apparatuses that do not have a navigation function. Examples of the information processing apparatus to which the present technology is applied include personal computers (PCs), video processing apparatuses, game consoles, music players, and home appliances.

First, FIG. 1 shows that a navigation apparatus 10 according to the present embodiment primarily includes an operation detection unit 105, a communication unit 110, a position information acquiring unit 115, a display unit 120, a storage unit 125, and a control unit 130.

(Operation Detection Unit 105)

The operation detection unit 105 has a function of detecting an operation that has been input. The operation detection unit 105 may include an input unit such as a touch panel, a mouse, a keyboard, a button, a microphone, an imaging device, a switch, and a lever for a user to input information, and an input control circuit that generates an input signal on the basis of the input from the user and outputs the generated input signal to the control unit 130. As illustrated in FIG. 2, the operation detection unit 105 is a touch sensor 155 superimposed on a display device 150 and configured to detect a position of an operating object (such as a finger F of a user) on the display screen, and a microphone 160 used for speech recognition in the present embodiment.

(Communication Unit 110)

The communication unit 110 is a communication interface for a connection to an external apparatus 90 via a communication path. The communication unit 110 may be a communication device supporting wireless local area networks (LANs), a communication device supporting wireless USB, or a wired communication device that performs wired communication. The communication unit 110 has the functions of a transmitter and a receiver that transmits various information to and receives various information from the external apparatus 90.

(Position Information Acquiring Unit 115)

The position information acquiring unit 115 has a function of acquiring current position information. For example, the position information acquiring unit 115 may include a global positioning system (GPS) antenna and a GPS processing unit that calculates position information from a GPS reception signal. Alternatively, the position information acquiring unit 115 may have an autonomous positioning function with various sensors. The position information acquiring unit 115 may also have a Wi-Fi positioning function with the reception strength of Wi-Fi radio waves received from base stations. The position information acquiring unit 115 may use various indoor positioning techniques to acquire position information. Examples of the indoor positioning techniques include the Indoor Messaging System (IMES) also called indoor GPS, visible light communication, infrared communication, a radio frequency identification (RFID) tag, a Quick Response (QR) code, and Bluetooth (registered trademark). The position information acquiring unit 115 can also acquire position information by using charging information and check-in information. The position information acquiring unit 115 may, for example, regard the location of an actual shop that charges a user as the current position of the user at the time of charging. The position information acquiring unit 115 may also regard the location of a building in which a user checks as the current position of the user at the time of the check-in.

(Display Unit 120)

The display unit 120 is an example of an output device, and may also be a display device such as a liquid crystal display (LCD) device and an organic electroluminescence display (OELD) device.

(Storage Unit 125)

The storage unit 125 is a device for data storage, and can include a storage medium, a recording device that records data on a storage medium, a read-out device that reads out data from a storage medium, and a deletion device that deletes data recorded on a recording medium. For example, nonvolatile memory such as flash memory, magnetoresistive random access memory (MRAM), ferroelectric random access memory (FeRAM), phase change random access memory (PRAM) and electronically erasable and programmable read only memory (EEPROM), and a magnetic recording medium such as a hard disk drive (HDD) may be used as a storage medium. The storage unit 125 can, for example, store map data and information on a point of interest (POI).

(Control Unit 130)

The control unit 130 has a function of controlling the whole operation of the navigation apparatus 10. The control unit 130 can function as a communication control unit, for example, by controlling the communication unit 110. The control unit 130 can also function as a positioning control unit by controlling the position information acquiring unit 115. The control unit 130 can further function as a display control unit by controlling the display unit 120. The control unit 130 can display a first map M1 and a second map M2 on the display unit 120. The second map M2 is associated with a first spot selected on the first map M1. The second map M2 may be, for example, an indoor map for a building that is the first spot. For example, when the first spot is a building, the second map M2 may be generated for each floor. The control unit 130 can function as a navigation unit by using a positioning function, a display control function, and the like. The control unit 130 functioning as a navigation unit may, for example, have a route search function, a current position display function, and the like.

As illustrated in FIG. 3, when the first map M1 is displayed and a user selects a first display object OBJ1 on the first map M1 with his/her finger F, the control unit 130 can display the second map M2 instead of the first map M1, the second map M2 being associated with a first spot indicated by the first display object OBJ1. It is then desirable that the second map M2 be displayed in a suitable state that allows a user to grasp the whole image of a floor. The control unit 130 may, for example, display the second map M2 such that the whole second map M2 can be displayed within the display screen. The detailed operation including an operation of switching the display of the first map M1 to the display of the second map M2 and representations will be described below.

(Operation of Selecting First Spot)

First, an operation of selecting a first spot will be described with reference to FIG. 4. For example, an operation that a user selects a spot on the first map M1 for which the second map M2 is displayed may be an operation of surrounding the first display object OBJ1 displayed on the first map M1 for indicating the first spot. A user can select the spot by moving his/her finger so as to surround the first display object OBJ1 on the first map M1. The operation of selecting a spot on the first map M1 for which the second map M2 is displayed is not limited thereto, but may include various operations. For example, the operation of selecting a spot may be an operation of tapping the first spot. The operation of selecting a spot may also be an operation of double-tapping the first spot in order to prevent an operational error. The operation of selecting a spot may also be a holding-down operation of keeping the first spot selected for a predetermined time or more. The operation detection unit 105 accepts the operations described in the examples of selecting a spot on the first map M1 for which the second map is displayed. The operation of selecting a spot may be an operation of reading the name of the first spot aloud and may be recognized by speech recognition.

(Display of Spot Having Second Map)

The control unit 130 can display, on the first map M1, information relating to the presence or absence of the second map M2 associated with a spot on the first map M1. For example, the control unit 130 may display a first display object OBJ1 associated with the second map M2 and a first display object OBJ1 not associated with the second map M2 in different display forms. As illustrated in FIG. 5, the control unit 130, for example, colors the periphery of the first display object OBJ1 indicating a spot having the second map, so that the control unit 130 can show a user that the second map M2 associated with the spot exists. As illustrated in FIG. 6, the control unit 130 displays the shadow of the first display object OBJ1 indicating a spot having the second map, so that the control unit 130 can show a user that the second map M2 associated with the spot exists.

(Representation of Selected First Spot)

When much information is displayed on the first map M1, it might be difficult for a user to recognize a spot selected by the operation of selecting the spot. Once the operation of selecting a spot is detected, the control unit 130 may then display the first display object OJB1 in a different display form from those of other display objects OBJ, the first display object OJB1 indicating the spot selected by the first operation. According to the configuration, a user can check the selected spot by referring the display form. As illustrated in FIG. 7, the control unit 130 may, for example, change a color of the first display object OBJ1 indicating the selected spot. The control unit 130 may also display a display object OBJ near the selected spot, the display object OBJ showing that the spot has been selected.

(Display of Destination)

When the selected spot is a destination and a further detailed destination is set within the spot, the control unit 130 may display a position of the detailed destination on the second map M2. The detailed destination may, for example, refer to a particular shop in a building indicated by the selected spot. The control unit 130 may then display a second display object OBJ2 illustrated in FIG. 8 at a goal spot G. If the detailed destination has been set, the control unit 130 may display the guidance of a route to the detailed destination G on the second map M2.

As illustrated in FIG. 8, if a predetermined start spot S has been set, the control unit 130 may display the guidance of a route from the start spot S to the detailed destination G on the second map M2. The start spot S may, for example, refer to the entrance, or the bottom or top of stairs/an escalator/an elevator of a building, or the current position. For example, a route R from the start spot S to the goal spot G may be displayed for the guidance of the route.

(Selection of Floor)

The second map M2 may be generated for each floor. The control unit 130 may, for example, select a floor that is first to be displayed on the basis of the current position of a user. For example, when the current position of a user is a parking area in a building, the control unit 130 can select a floor for which the second map M2 is displayed, on the basis of the floor of the parking area. When it is detected that a user enters the building from the entrance on the first floor, the control unit 130 may display the second map M2 for the first floor. A floor for which the second map M2 is displayed may be, for example, selected by a user. Various selection screens on which a user selects a floor are conceivable. For example, as illustrated in FIG. 9, when the first display object OBJ1 indicating the first spot is selected, choices of floors may be displayed in a form in which a user can select one of them.

For example, FIG. 9 illustrates an example in which BB building is two stories high. When the first display object OBJ1 is here selected on the first map M1, a button is displayed near the selected first display object OBJ1 for selecting the second map M2. The displayed button may, for example, include a button 1002 for selecting a second map M2_1 for the first floor and a button 1004 for selecting a second map M2_2 for the second floor. When a user selects the button 1004 for selecting the second map M2_2 for the second floor, the second map M2_2 for the second floor is displayed instead of the first map M1. If the detailed destination has been set, the button may represent a floor including the detailed destination. For example, FIG. 10 illustrates an example of a floor selection screen on which the destination is set to the second floor. According to the configuration, a user can know with which second map M2 a floor including the detailed destination is associated before checking the content of the second map M2.

(Operation of Switching Floors)

When the second map M2 for a floor is displayed and a predetermined second operation is detected, the control unit 130 can switch floors to be displayed. The second operation may be, for example, an operation of flicking the displayed second map M2. The flicking operation allows a user to turn the second map M2_1 to the second map M2_2 with his/her finger F. When the second map M2_2 for the second floor returns to the second map M2_1 for the first floor, an operation of flicking the map in the reverse direction allows the second map M2_2 for the second floor to return to the second map M2_1 for the first floor. Floor numbers may be displayed side by side and a user may select one of them to switch the floors.

(Searching for Spot on Second Map)

The control unit 130 can provide a function of searching for a spot on the second map M2. For example, as illustrated at the top of FIG. 12, when a user selects a search button 1010 for executing a search function among function buttons with his/her finger F, the control unit 130 can display a category selection screen as illustrated in the middle of FIG. 12. A user selects a category of a spot to be searched for on the currently displayed second map M2 on the category selection screen. A second map M2A for a department store is here displayed. The control unit 130 may then display a category selection button according to a type of a selected first spot, i.e. a type of a spot indicated by the currently displayed second map M2A. For example, the spot of a department store and the spot of a stadium would lead to different categories of spots that a user would like to search for. The control unit 130 can thus preferentially display a category of a spot that a user is very likely to want to know in accordance with a type of the spot.

For example, as illustrated in FIG. 12, when the second map M2A for the department store is displayed, the control unit 130 may display a search button 1012 for searching for a position of the restroom, a search button 1014 for searching for a position of a lounge such as a café, and a search button 1016 for searching for a position of an automatic transaction machine. For example, when the search button 1012 for searching for a position of the restroom is selected from them, the control unit 130 can display an icon 1018 indicating a position of the restroom on the second map M2A. The control unit 130 may then display a route from the current position to a spot that has been searched for on the second map M2A.

As illustrated at the top of FIG. 13, when the second map M2B for a stadium is displayed and a search button 1020 is selected, the control unit 130 can display a category selection screen as illustrated in the middle of FIG. 13. The category selection screen preferentially includes a button for selecting a type of the spot, i.e. selecting a category suitable for the stadium. For example, a button 1022 for searching for a seat on the home side, a button 1024 for searching for a seat on the away side, and a button 1026 for searching for a smoking area may be displayed on the second map M2B for the stadium. When the button 1026 for searching for a smoking area is selected, the control unit 130 can display an icon 1028 indicating a position of a smoking area on the second map M2B.

In this way, a category according to a type of the selected spot is displayed, allowing a user to obtain desired information in a shorter time. This thus enhances the operability for users.

(Proposal of Information)

The control unit 130 can provide a user with information proposed from the external apparatus 90 by acquiring the information from the external apparatus 90 via the communication unit 110. For example, as illustrated in FIG. 14, a balloon 1030 is displayed at a spot where an event is held on the first map M1, informing a user of the presence of the event. As illustrated in FIG. 15, a balloon 1032 is displayed at another detailed spot where an event is held on the second map M2, informing a user of the detailed position at which the event is held.

The navigation apparatus 10 may also be able to be directly carried by a user and provide a walking navigation function. As illustrated in FIG. 2, the portable navigation apparatus 10 can be attached to the dashboard or the like of a vehicle via a cradle 14 and a sucker 16, and provide an in-vehicle navigation function.

The example of the function of the terminal apparatus 10 according to the present embodiment has been shown so far. The structural elements that have been described above may be formed of general-purpose members and circuits, or of hardware specialized for the function of each structural element. A control program having a processing procedure for a processing device such as a central processing unit (CPU) to implement the function of each structural element may be read out from a storage medium such as read only memory (ROM) and random access memory (RAM) storing the control program, and then the program may be interpreted and executed in order to perform the function of each structural element. Thus, a configuration used can be modified as appropriate according to the technological level at the time of the implementation of the present embodiment.

It is possible to make a computer program for implementing each function of the navigation apparatus 10 according to the present embodiment as mentioned above, and then implement the computer program in a personal computer or the like. There can also be provided a computer-readable recording medium having the computer program stored therein. Examples of the recording medium include magnetic disks, optical discs, magneto-optical disks, and flash memory. The computer program may also be distributed via a network, for example, using no recording medium.

2. Operation Example

Figure 16:
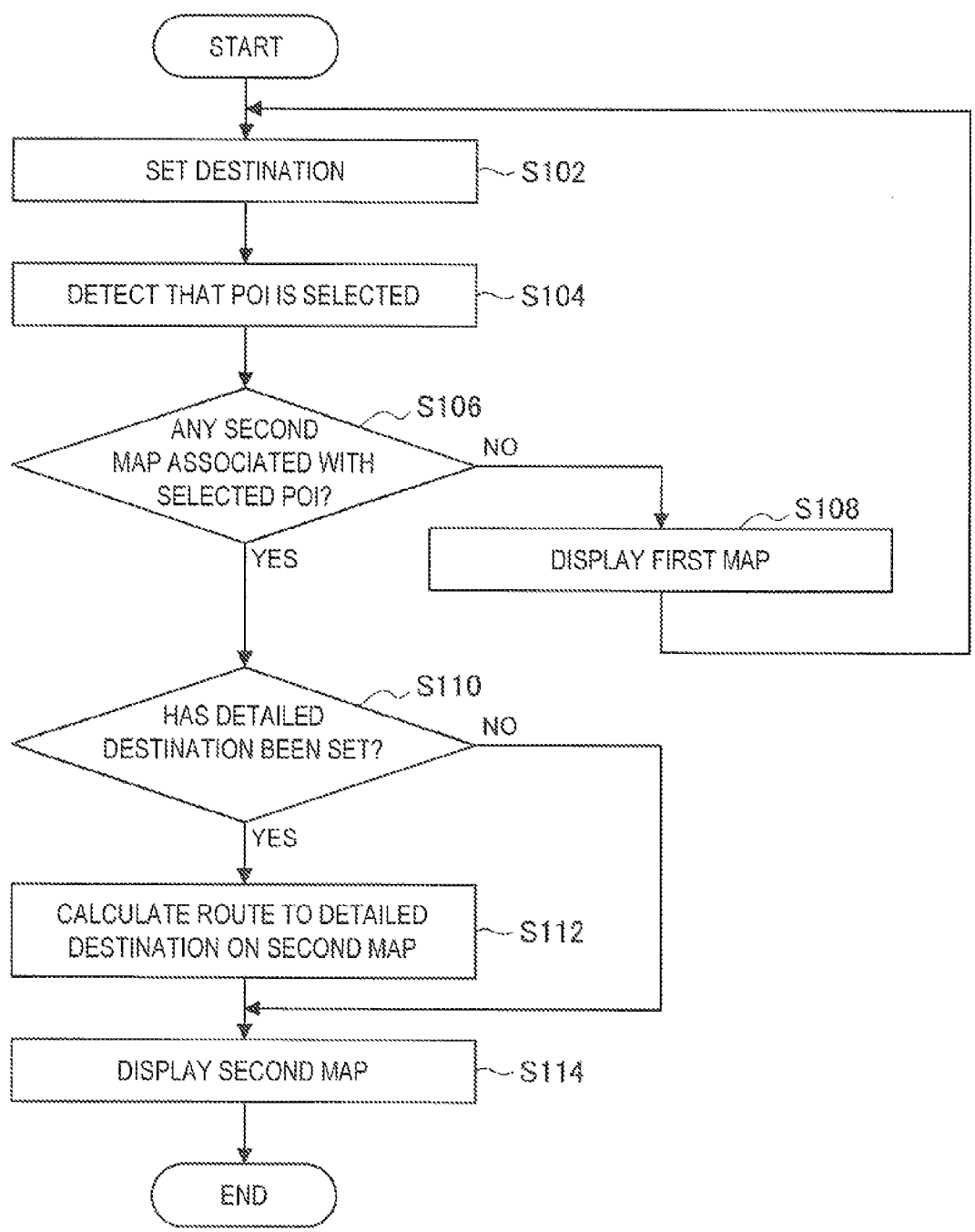
FIG. 16 is a flowchart illustrating an operation example of the navigation apparatus according to the present embodiment.

Next, an operation example of the navigation apparatus 10 according to an embodiment of the present disclosure will be described with reference to FIG. 16. FIG. 16 is a flowchart illustrating the operation example of the navigation apparatus according to the present embodiment.

First, the control unit 130 sets a destination in accordance with an input from a user (S102). The control unit 130 then detects that a user selects a POI (S104). The control unit judges whether there is any second map M2 associated with the selected POI (S106). If the judgment in step S106 shows that there is no second map M2 associated with the selected POI, the first map M1 is then displayed (S108). To the contrary, if it is judged that there is a second map associated with the selected POI, the control unit 130 then judges whether a detailed destination has been set (S110).

If the judgment in step S110 shows that a detailed destination has been set, the control unit 130 calculates a route to the detailed destination on the second map (S112). To the contrary, if the judgment in step S110 shows that a detailed destination has not been set, the processing in step S112 is omitted. The control unit 130 then displays the second map M2 (S114). If a detailed destination has been set, the route calculated in step S112 may be displayed on the second map.

3. Hardware Configuration Example

Next, a hardware configuration example of the navigation apparatus 10 according to an embodiment of the present disclosure will be described with reference to FIG. 17. FIG. 17 is a block diagram illustrating a hardware configuration of the navigation apparatus according to the present embodiment.

A configuration example of the navigation apparatus 10 will be now described. FIG. 9 shows that the navigation apparatus 10 includes, for example, a telephone network antenna 817, a telephone processing unit 819, a GPS antenna 821, a GPS processing unit 823, a Wifi antenna 825, a Wifi processing unit 827, a geomagnetic sensor 829, an acceleration sensor 831, a gyro sensor 833, an air pressure sensor 835, an imaging unit 837, a central processing unit (CPU) 839, read only memory (ROM) 841, random access memory (RAM) 843, an operation unit 847, a display unit 849, a decoder 851, a speaker 853, an encoder 855, a microphone 857, and a storage unit 859. The hardware configuration illustrated here is an example. Some of the structural elements may be omitted. There is no need to say that a structural element other than the structural elements illustrated here may be further added.

(Telephone Network Antenna 817)

The telephone network antenna 817 is an example of an antenna having a function of wirelessly connecting to a mobile phone network for telephone call and communication. The telephone network antenna 817 can supply a telephone call signal received via a mobile phone network to the telephone processing unit 819.

(Telephone Processing Unit 819)

The telephone processing unit 819 has a function of performing various signal processing on signals transmitted and received by the telephone network antenna 817. For example, the telephone processing unit 819 can receive an input via the microphone 857, perform various signal processing on an audio signal encoded by the encoder 855, and supply the encoded audio signal to the telephone network antenna 817. The telephone processing unit 819 can also perform various signal processing on an audio signal supplied from the telephone network antenna 819, and supply the audio signal to the decoder 851.

(GPS Antenna 821)

The GPS antenna 821 is an example of an antenna that receives a signal from a positioning satellite. The GPS antenna 821 can receive GPS signals from GPS satellites, and inputs the received GPS signals to the GPS processing unit 823.

(GPS Processing Unit 823)

The GPS processing unit 823 is an example of a calculation unit that calculates position information on the basis of the signals received from the positioning satellites. The GPS processing unit 823 calculates current position information on the basis of the GPS signals input from the GPS antenna 821, and outputs the calculated position information. Specifically, the GPS processing unit 823 calculates the positions of GPS satellites from orbital data of the GPS satellites, and calculates the distances from the respective GPS satellites to the navigation apparatus 10 on the basis of the time difference between the transmission time and the reception time of the GPS signals. The GPS processing unit 823 can then calculate the current three-dimensional position on the basis of the calculated positions of the respective GPS satellites and the distances from the respective GPS satellites to the navigation apparatus 10. The orbital data of the GPS satellites used here may be, for example, included in the GPS signals. Alternatively, the orbital data of the GPS satellites may also be acquired from an external server via the communication antenna 825.

(Wifi Antenna 825)

The Wifi antenna 825 is an antenna having a function of transmitting and receiving a communication signal with a wireless local area network (LAN) communication network, for example, in accordance with the specification of Wifi. The Wifi antenna 825 can supply the received signal to the communication processing unit 827.

(Wifi Processing Unit 827)

The Wifi processing unit 827 has a function of performing various signal processing on the signal supplied from the Wifi antenna 825. The Wifi processing unit 827 can supply a digital signal generated from the supplied analog signal to the CPU 839.

(Geomagnetic Sensor 829)

The geomagnetic sensor 829 is a sensor that detects geomagnetism as a voltage value. The geomagnetic sensor 829 may be a triaxial geomagnetic sensor that detects geomagnetism in the X-axial direction, the Y-axial direction, and the Z-axial direction. The geomagnetic sensor 829 can supply data of the detected geomagnetism to the CPU 839.

(Acceleration Sensor 831)

The acceleration sensor 831 is a sensor that detects acceleration as a voltage value. The acceleration sensor 831 may be a triaxial acceleration sensor that detects acceleration along the X-axial direction, acceleration along the Y-axial direction, and acceleration along the Z-axial direction. The acceleration sensor 831 can supply data of the detected acceleration to the CPU 839.

(Gyro Sensor 833)

The gyro sensor 833 is a kind of measuring instrument that detects an angle and angular velocity of an object. The gyro sensor 833 may be a triaxial gyro sensor that detects, as voltage values, the changing velocity (angular velocity) of rotational angles with respect to the X-axis, the Y-axis, and the Z-axis. The gyro sensor 833 can supply data of the detected angular velocity to the CPU 839.

(Air Pressure Sensor 835)

The air pressure sensor 835 is a sensor that detects the atmospheric pressure in a nearby area as a voltage value. The air pressure sensor 835 detects the atmospheric pressure at a predetermined sampling frequency, and can supply data of the detected atmospheric pressure to the CPU 839.

(Imaging Unit 837)

The imaging unit 837 has a function of shooting a still image or a moving image via a lens under the control of the CPU 839. The imaging unit 837 may cause the storage unit 859 to store the shot image.

(CPU 839)

The CPU 839 functions as a processing device and a control device, and controls the whole operation of the navigation apparatus 10 in accordance with various programs. The CPU 839 may also be a microprocessor. The CPU 839 can implement various functions in accordance with various programs.

(ROM 841 and RAM 843)

The ROM 841 can store a program, an operation parameter, and the like used by the CPU 839. The RAM 843 can temporarily store a program used upon the execution of the CPU 839 and a parameter changing as necessary upon the execution.

(Operation Unit 847)

The operation unit 847 has a function of generating an input signal for a user to perform a desired operation. The operation unit 847 may include an input unit such as a touch sensor, a mouse, a keyboard, a button, a microphone, a switch, and a lever used for a user to input information, and an input control circuit that generates an input signal on the basis of the input from the user and then outputs the generated input signal to the CPU 839.

(Display Unit 849)

The display unit 849 is an example of an output device, and may be a display device such as a liquid crystal display (LCD) device and an organic light emitting diode (OLED) display device. The display unit 849 can provide information by displaying a screen for a user.

(Decoder 851 and Speaker 853)

The decoder 851 has a function of decoding and performing analogue conversion on input data under the control of the CPU 839. The decoder 851 can decode and perform analogue conversion on audio data input via the telephone network antenna 817 and the telephone processing unit 819, for example, and then output the audio signal to the speaker 853. The decoder 851 can also decode and perform analogue conversion on audio data input via the Wifi antenna 825 and the Wifi processing unit 827, for example, and then output the audio signal to the speaker 853. The speaker 853 can output a sound on the basis of the audio signal supplied from the decoder 851.

(Encoder 855 and Microphone 857)

The encoder 855 has a function of performing digital conversion on and encoding input data under the control of the CPU 839. The encoder 855 can perform digital conversion on and encode an audio signal input from the microphone 857, and then output the audio data. The microphone 857 can collect a sound, and then output the collected sound as an audio signal.

(Storage Unit 859)

The storage unit 859 is a device for data storage, and can include a storage medium, a recording device that records data on a storage medium, a read-out device that reads out data from a storage medium, and a deletion device that deletes data recorded on a storage medium. For example, a nonvolatile memory such as flash memory, magnetoresistive random access memory (MRAM), ferroelectric random access memory (FeRAM), phase change random access memory (PRAM) and electronically erasable and programmable read only memory (EEPROM), and a magnetic recording medium such as a hard disk drive (HDD) may be used as a storage medium.

4. Effect Example

As described above, according to the present disclosure, burdens on a user are reduced for switching a map to another map. Users can enjoy uniform user experience for unconsciously displaying different maps. If a detailed destination has been set, the detailed destination is displayed on the second map without any other destination setting operations and a route to the destination is calculated, thereby allowing a user to continue the route guidance on different maps.

The second map is not embedded in the first map, but specialized for some building. This allows a user to acquire necessary information in a suitable form when the user is in the building. A search and route guidance specialized for the building are seamlessly provided, enhancing user experience. The operability and convenience for users are thus enhanced.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

The steps illustrated in the flowcharts in the present description naturally include processes performed in the described and chronological order, and further include processes that are not necessarily performed in chronological order, but are also performed in parallel or are individually performed. Needless to say, it is also possible to change the order as necessary even in the steps for chronologically performing the processes.

Additionally, the present technology may also be configured as below.

(1)
An information processing apparatus including:
a display control unit configured to display a first map; and
an operation detection unit configured to detect a first operation of selecting a first spot on the first map,
wherein the display control unit displays a second map associated with the selected first spot instead of the first map when the first operation is detected.

(2)
The information processing apparatus according to (1),
wherein, when the selected first spot is a destination, the display control unit displays the destination on the second map.

(3)
The information processing apparatus according to (2),
wherein the display control unit displays a route to the destination on the second map.

(4)
The information processing apparatus according to any one of (1) to (3),
wherein the display control unit displays the second map selected from the second maps.

(5)
The information processing apparatus according to (4),
wherein the second map is generated for each floor, and
wherein, when a second operation on the displayed second map is detected, the display control unit displays the second map for a floor different from a floor of the displayed second map.

(6)
The information processing apparatus according to any one of (1) to (5),
wherein the display control unit displays, on the second map, a search screen for searching for a second spot of a category according to a type of the first spot.

(7)
The information processing apparatus according to (6),
wherein the display control unit displays, on the second map, the second spot that has been searched for.

(8)
The information processing apparatus according to (7),
wherein the display control unit displays guidance of a route to the second spot on the second map.

(9)
The information processing apparatus according to any one of (1) to (8),
wherein the operation detection unit accepts an operation of surrounding a first display object displayed on the first map for indicating the first spot.

(10)
The information processing apparatus according to any one of (1) to (8),
wherein the operation detection unit accepts an operation of double-tapping the first spot on the first map.

(11)
The information processing apparatus according to any one of (1) to (8),
wherein the operation detection unit accepts an operation of keeping the first spot on the first map selected for a predetermined time or more.

(12)
The information processing apparatus according to any one of (1) to (11),
wherein the display control unit displays, on the first map, information on presence or absence of the second map associated with the first spot.

(13)
The information processing apparatus according to any one of (1) to (12),
wherein the display control unit displays the first display object with which the second map is associated in a display form different from a display form of the first display object with which the second map is not associated.

(14)
The information processing apparatus according to any one of (1) to (13), further including:
a display information acquiring unit configured to acquire display information on the selected first spot from an external apparatus,
wherein the display control unit displays the acquired information.

(15)
The information processing apparatus according to any one of (1) to (14),
wherein the display control unit displays additional information associated with the selected first spot.

(16)
The information processing apparatus according to any one of (2) to (15),
wherein the display control unit displays, on the second map, a second display object indicating the destination.

(17)
The information processing apparatus according to any one of (1) to (16),
wherein the operation detection unit detects an operation by recognizing a sound.

(18)
An information processing method including:
displaying a first map;
detecting a first operation of selecting a first spot on the first map; and
displaying a second map associated with the selected first spot instead of the first map when the first operation is detected.

(19)
A program for causing a computer to execute:
a display control function of displaying a first map; and
an operation detection function of detecting a first operation of selecting a first spot on the first map,
wherein the display control function is a function of displaying a second map associated with the selected first spot instead of the first map when the first operation is detected.

REFERENCE SIGNS LIST 10 navigation apparatus (information processing apparatus)
105 operation detection unit
110 communication unit
115 position information acquiring unit
120 display unit
125 storage unit
130 control unit
90 external apparatus

The invention claimed is:

1. An information processing apparatus comprising:
   an input device to enable a user to input a number of commands including a selection command;
   a memory to have a program stored thereon;
   a central processing unit (CPU), upon executing the program from the memory, to
      cause a first map to be displayed on a display device, the first map having a number of first type objects and a number of second type objects displayed thereon,
      cause a first type object to be displayed in a first display manner on the first map to provide an indication to the user that a respective second map which is associated with the respective first type object and different from the first map is available, and cause a second type object to be displayed in a second display manner on the first map which is different from the first display manner to provide an indication to the user that the respective second map is unavailable, and
      cause, upon detection of a selection command from the user by way of the input device which indicates selection of the respective first type object, display of the selected respective first type object to be changed from the first display manner to a third display manner which is different from the first display manner and the second display manner so as to enable the user to confirm that a correct selection was detected.

2. The information processing apparatus according to claim 1,
   in which the number of commands includes a destination command, and
   in which, upon executing the program, the CPU is configured to cause a route to a desired destination to be displayed on the second map in response to the destination command.

3. The information processing apparatus according to claim 1, in which when the respective first type object is a building and the second map is a map of a floor of the building.

4. The information processing apparatus according to claim 1, in which when the respective first type object is a building and the second map is a map of each floor of the building.

5. The information processing apparatus according to claim 1, in which upon executing the program, the CPU is configured to cause display on the respective second map of a search screen for searching for a second spot of a category according to a type of the first spot.

6. The information processing apparatus according to claim 1, the CPU is configured to cause the selected respective first type object to be displayed on the first map for a predetermined time.

7. The information processing apparatus according to claim 1, further comprising an antenna device to wirelessly acquire from an external apparatus display information pertaining to the selected respective first type object, and in which the CPU is configured to cause the display information to be displayed on the display device.

8. An information processing method for use with an information processing apparatus having an input device to enable a user to input a number of commands including a selection command, said method comprising:
   causing a first map to be displayed on a display device, the first map having a number of first type objects and a number of second type objects displayed thereon,
   causing a first type object to be displayed in a first display manner on the first map to provide an indication to the user that a respective second map which is associated with the respective first type object and different from the first map is available, and causing a second type object to be displayed in a second display manner on the first map which is different from the first display manner to provide an indication to the user that the respective second map is unavailable, and
   causing, upon detection of a selection command from the user by way of the input device which indicates selection of the respective first type object, display of the selected respective first type object to be changed from the first display manner to a third display manner which is different from the first display manner and the second display manner so as to enable the user to confirm that a correct selection was detected.

9. A non-transitory computer readable storage memory having stored thereon a program which upon execution by a computer causes an information processing apparatus having an input device to enable a user to input a number of commands including a selection command to perform a method comprising:
   causing a first map to be displayed on a display device, the first map having a number of first type objects and a number of second type objects displayed thereon,
   causing a first type object to be displayed in a first display manner on the first map to provide an indication to the user that a respective second map which is associated with the respective first type object and different from the first map is available, and causing a second type object to be displayed in a second display manner on the first map which is different from the first display manner to provide an indication to the user that the respective second map is unavailable, and
   causing, upon detection of a selection command from the user by way of the input device which indicates selection of the respective first type object, display of the selected respective first type object to be changed from the first display manner to a third display manner which is different from the first display manner and the second display manner so as to enable the user to confirm that a correct selection was detected.

* * * * *